(12) United States Patent
Tanner et al.

(10) Patent No.: US 6,962,070 B1
(45) Date of Patent: Nov. 8, 2005

(54) APPARATUS AND METHOD FOR MEASURING CHARACTERISTICS OF FLUID SPRAY PATTERNS

(75) Inventors: Kristy Tanner, Carol Stream, IL (US); Patrick Chinn, Carol Stream, IL (US); Lesli Robb, Glendale Heights, IL (US)

(73) Assignee: Spraying Systems Co., Wheaton, IL (US)

( * ) Notice: Subject to any disclaimer, the term of this patent is extended or adjusted under 35 U.S.C. 154(b) by 0 days.

(21) Appl. No.: 10/897,772

(22) Filed: Jul. 23, 2004

Related U.S. Application Data

(60) Provisional application No. 60/565,997, filed on Apr. 28, 2004.

(51) Int. Cl.[7] ............................. G01N 3/08; G01N 3/30
(52) U.S. Cl. ................................................. 73/12.07
(58) Field of Search ............................. 73/168, 119 A, 73/12.07, 861.355, 81–85, 865.9; 239/172, 239/432; 451/259; 101/8; 74/428; 71/11

(56) References Cited

U.S. PATENT DOCUMENTS

| | | | | |
|---|---|---|---|---|
| 3,512,397 | A | * | 5/1970 | Nance ........................ 73/61.78 |
| 5,753,806 | A | * | 5/1998 | Ryan et al. ................ 73/119 A |
| 6,398,719 | B1 | * | 6/2002 | Kaneko et al. ............... 600/33 |
| 6,457,655 | B1 | * | 10/2002 | Reighard et al. .............. 239/8 |
| 6,742,730 | B2 | * | 6/2004 | Kassanits .................... 239/597 |

* cited by examiner

*Primary Examiner*—Max Noori
*Assistant Examiner*—Octavia Davis
(74) *Attorney, Agent, or Firm*—Leydig, Voit & Mayer, Ltd.

(57) ABSTRACT

An automated impact testing system provides reliable measurements of spray patterns of high-impact nozzles. The impact testing system includes a load cell mounted on a transport for controlled movements in two directions. The load cell includes a sensing pin extending through an aperture in a protective housing of the load cell. A special relationship between the dimensions of the sensing pin and the aperture allows the load cell to produce error-free impact measurement data.

20 Claims, 19 Drawing Sheets

APPARATUS AND METHOD FOR MEASURING CHARACTERISTICS OF FLUID SPRAY PATTERNS

RELATED APPLICATIONS

This application claims the priority of U.S. Provisional Application 60/565,997, filed Apr. 28, 2004.

FIELD OF THE INVENTION

This invention pertains generally to spraying systems for spraying fluids such as water and air, and more particularly to an apparatus and method for measuring the spray characteristics of fluid spray patterns generated by high-impact spray devices.

BACKGROUND OF THE INVENTION

High-impact spray nozzles are used in various industrial and other applications where a spray of high-pressure fluid (e.g., water or air) is required. For instance, high-impact water sprays are used in steel industry to de-scale rolled steel sheets. For industrial applications, the highest impact per unit area achievable is an important performance parameter for a high impact spray nozzle. Moreover, a high-impact spray nozzle is typically designed to provide a well-defined spray pattern with substantially even pressure within the pattern. To provide spray nozzles of the highest quality, it is of critical importance to be able to actually measure the characteristics, such as the pressure distribution and shape, of the spray pattern produced by a high-impact nozzle.

The high pressure of the spray from a high-impact nozzle, however, can make it very difficult to obtain reliable and repeatable readings of the fluid pressure at different points in the spray pattern. Accordingly, there has been a need for an impact testing system that can be used to accurately determine the spray characteristics of the spray pattern generated by a high-impact spray nozzle.

BRIEF SUMMARY OF THE INVENTION

In view of the foregoing, the present invention provides an impact testing system that can be used to reliably measure the characteristics of the spray pattern of a high-impact nozzle. The impact testing system includes a load cell that is mounted in a transport system for controlled movements of the load cell in two dimensions (X-Y). To measure the impact distribution of the spray generated by a nozzle, the load cell is moved through various points across the spray pattern, and the pressure at each point is detected and recorded.

The load cell includes a protective housing that contains a sensing pin mechanically coupled to a strain gauge. The sensing pin has a sensing end that extends through an aperture in a protection plate of the protective housing such that the end surface of the pin is subject to a high pressure fluid flow when it is moved into the spray pattern of the nozzle. The impact of the fluid on the sensing end of the pin causes the strain gauge to provide a reading, which may be processed and recorded by a control computer of the testing system.

In accordance with a feature of the invention, the sensing pin and the aperture in the protection plate have a special geometry that enables the pin to reliably sense the impact of high-pressure spray of a fluid, such as water or air, without producing erroneous data or a high level of noise that buries the real readings of the pressure impacting on the load cell. In one implementation, the aperture diameter is preferably about 0.075" larger than the diameter of the sensing end of the pin. Alternatively, the height of the pin and the dimensions of the pin and the aperture are such that the pin is allowed to have up to one degree of tilting when the sensing end of the pin moves about within the aperture under the impact of the high pressure fluid.

Additional features and advantages of the invention will be apparent from the following detailed description of illustrative embodiments which proceeds with reference to the accompanying figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Figure 1:
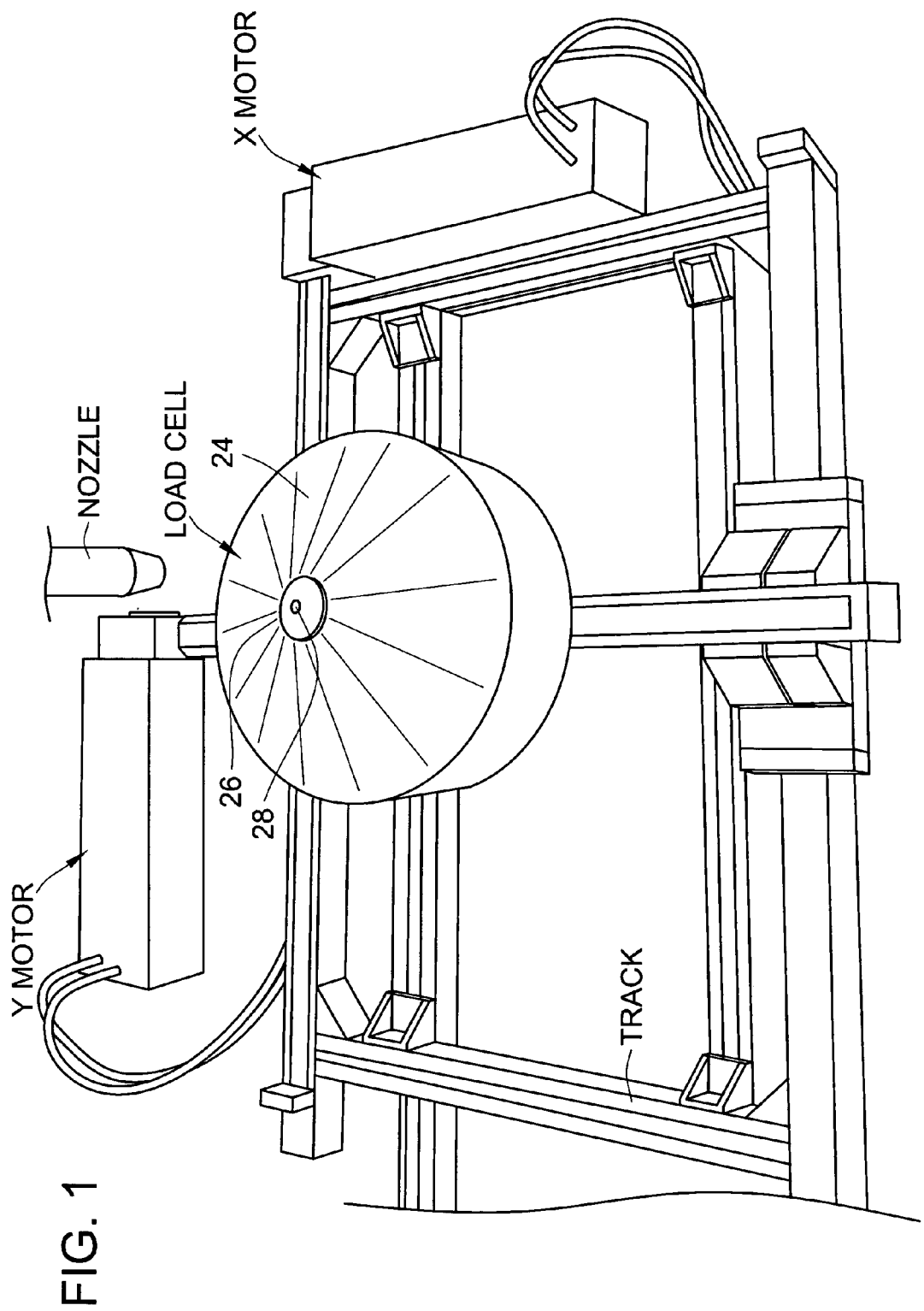
FIG. 1 is a perspective view of a load cell of an impact testing system of an embodiment of the invention for monitoring spray characteristics of a spray pattern.

Turning now to the drawings, in which like numbers are used to refer to similar elements, FIG. 1 shows a portion of an impact testing system. As shown in FIG. 1, the impact testing system includes a load cell 20 that is mounted on a transport system 22. In the embodiment shown in FIG. 1, the load cell 20 is enclosed in a protective housing 24 that has a round drum-like shape, with a slightly conical top surface. At the center of the top surface of the protective housing is an aperture 26. Inside the aperture 26 is a sensing pin 28, which is mounted inside the housing 24.

Figure 4:
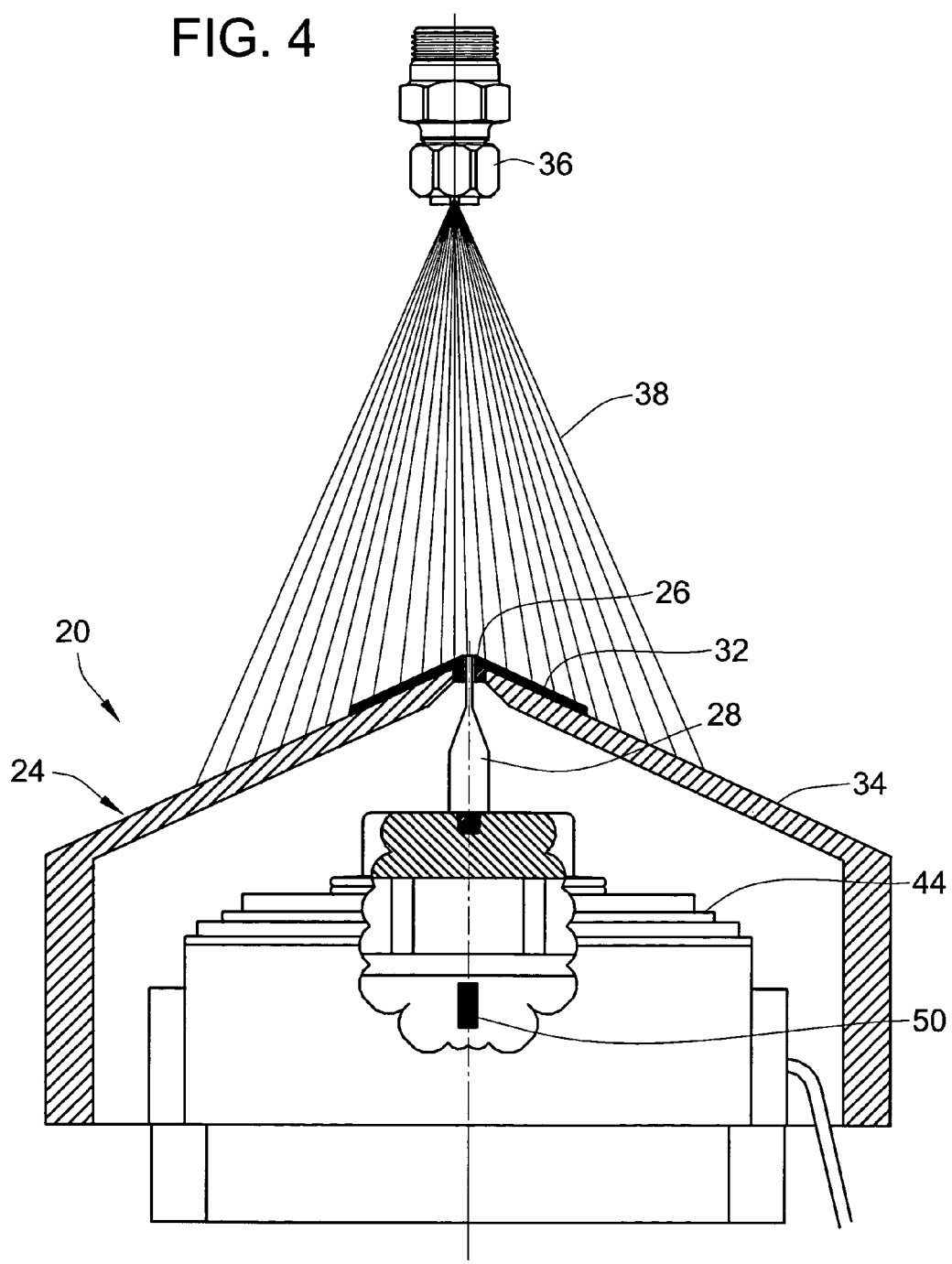
FIG. 4 is a partially cut-away view of the load cell under a spray generated by a spray nozzle.
Figure 5:
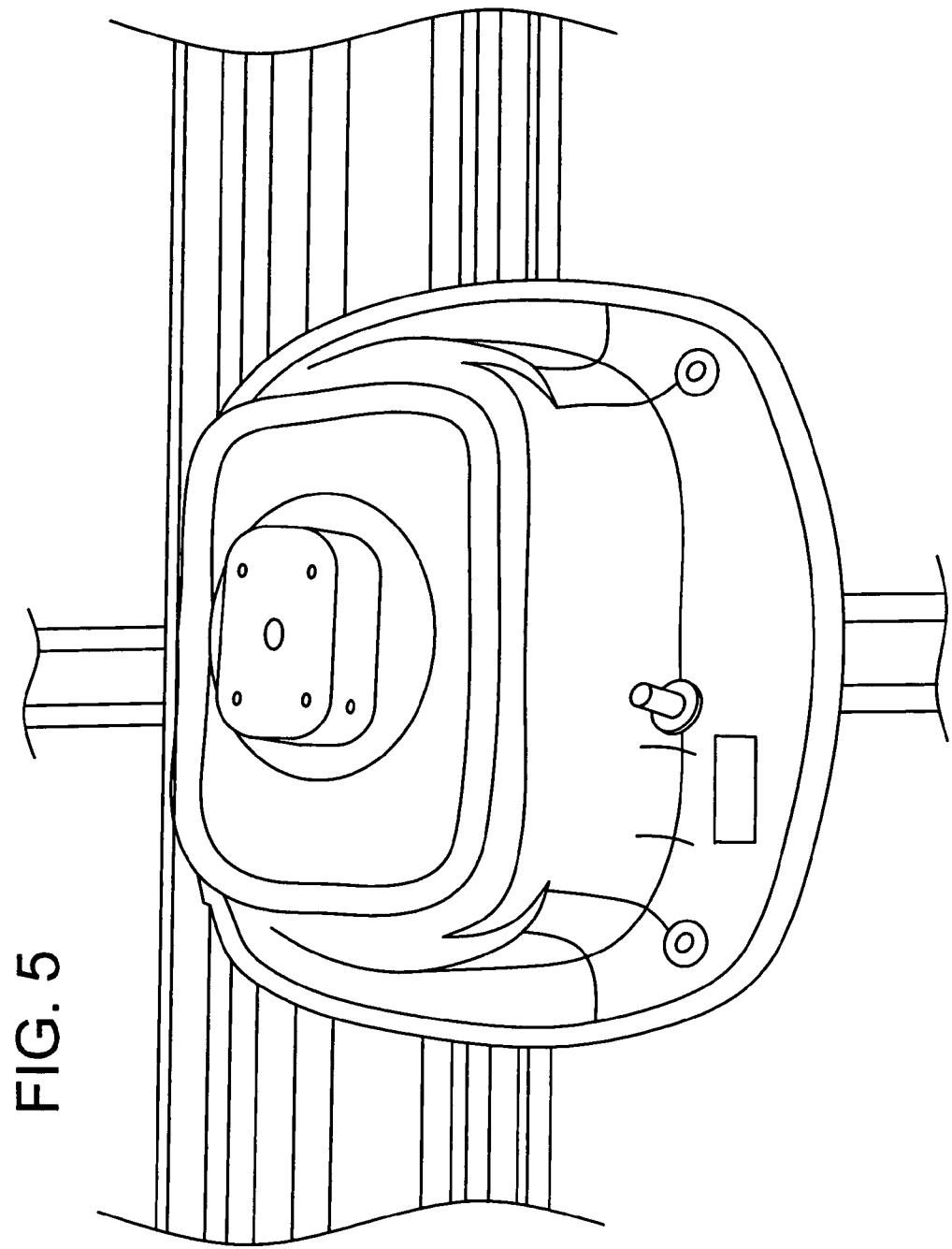
FIG. 5 is a perspective view of a base in the load cell for supporting a sensing pin.
Figure 6:
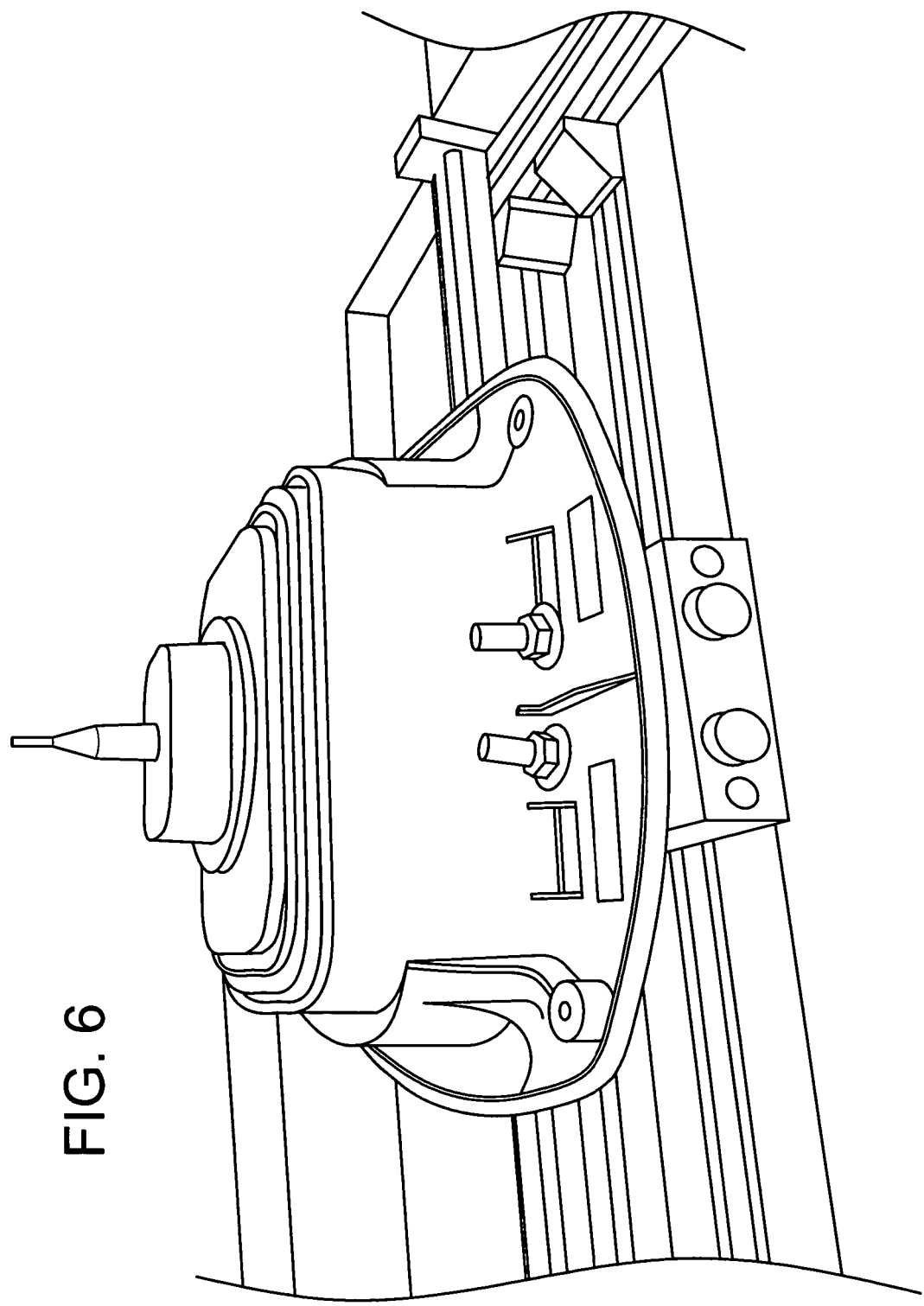
FIG. 6 is a perspective view of the base with a sensing pin mounted thereon.
Figure 10C:
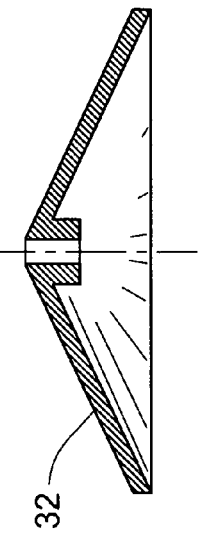
FIGS. 10a–c are various views of a protection plate of the load cell that has an aperture through which an end of the sensing pin may be exposed.
Figure 10A:
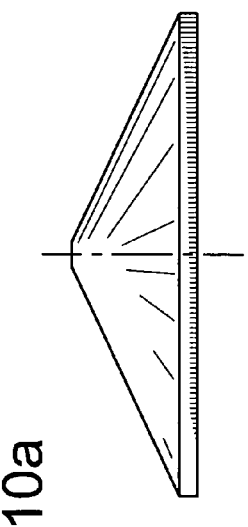
Figure 10B:
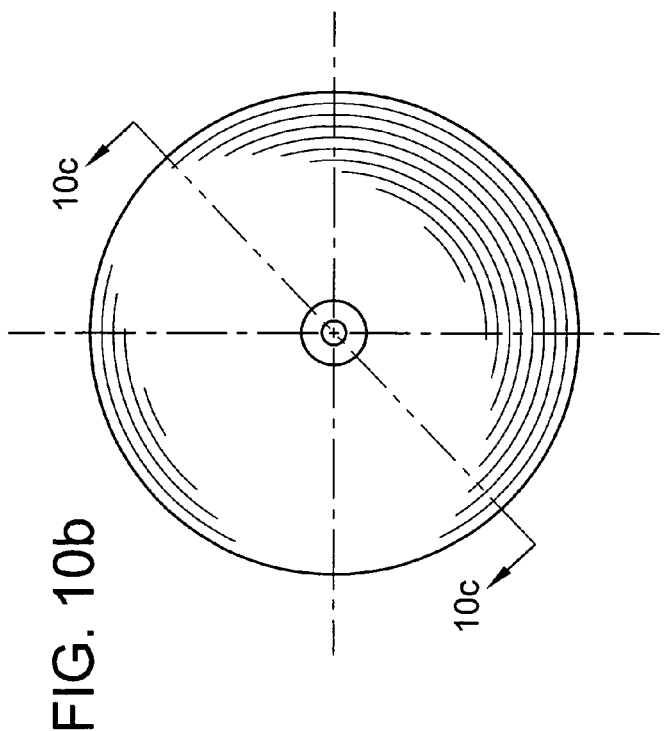
Figure 11C:
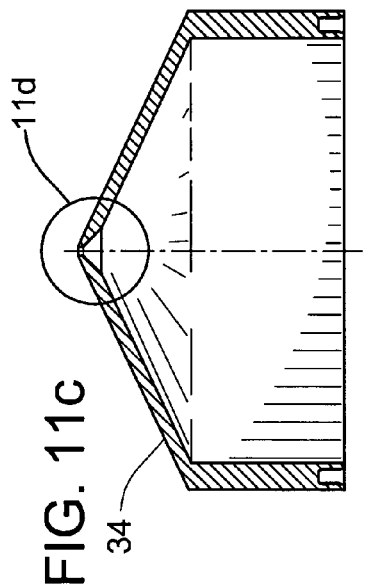
FIGS. 11a–d are various views of a protection cover of the load cell.
Figure 11D:
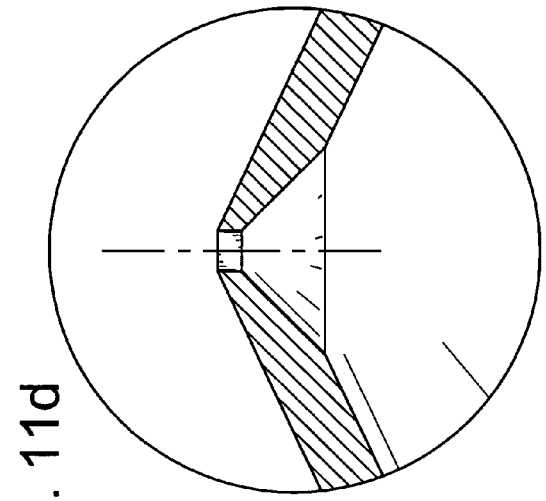
Figure 11A:
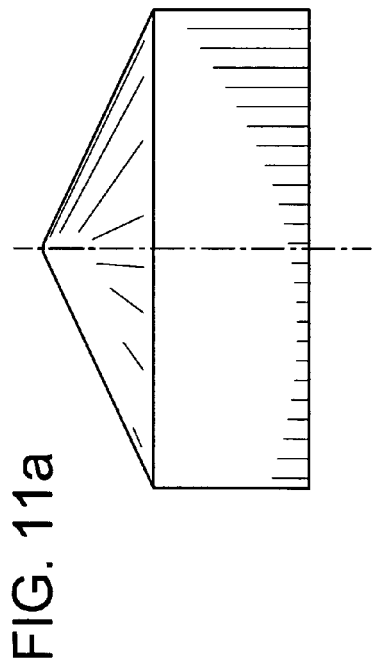
Figure 11B:
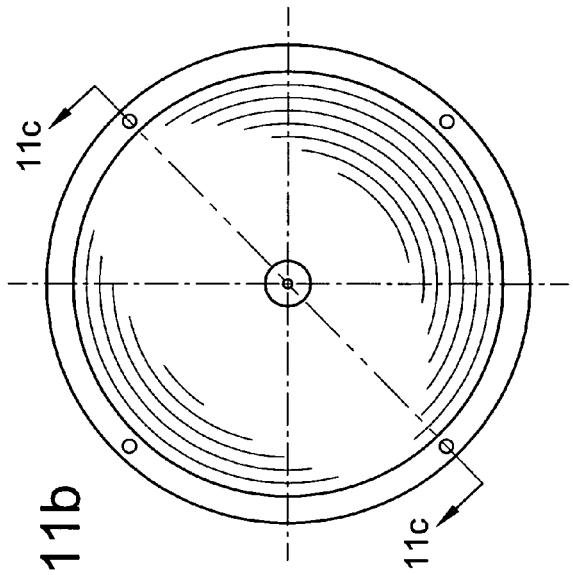

As shown in FIG. 4, the protective housing 24 includes an impact cover plate 32 is disposed at the center of the conical top of the housing, and a protective cover 34. FIGS. 10a–c show various views, including a cross-sectional view, of the impact cover plate 32, and FIGS. 11a–d show various views, including a cross-sectional view, of the protective cover 34. The impact cover plate 32 is subject to a high pressure fluid spray during a spray pattern measurement and is thus preferably made of a durable material such as stainless steel. The protective cover 34 may be made of aluminum. The sensing pin 28 has a sensing end that extends through the aperture 26 in the impact cover plate 32 such that the end surface of the sensing pin is exposed to the spray 38 generated by a nozzle 36. The sensing pin is mounted on a base 40 that is covered by a waterproof housing 44. The base is supported on a strain gauge 50 schematically illustrated in FIG. 4. As a result, the sensing pin 28 is mechanically coupled to the strain gauge 50. To prevent overloading of the strain gauge 50, a safety stop is provided to limit the bending of a C-shaped beam in the strain gauge that is part of the pressure sensing mechanism of the strain gauge. The force exerted by the fluid of the spray 38 on the end surface of the sensing pin 28 is transferred via the mechanical coupling to the strain gauge 50, which generates an electrical signal corresponding to that force. FIG. 5 shows the base 40 without the sensing pin. FIG. 6 shows the base 40 with the sensing pin 28 mounted thereon.

Figure 9:
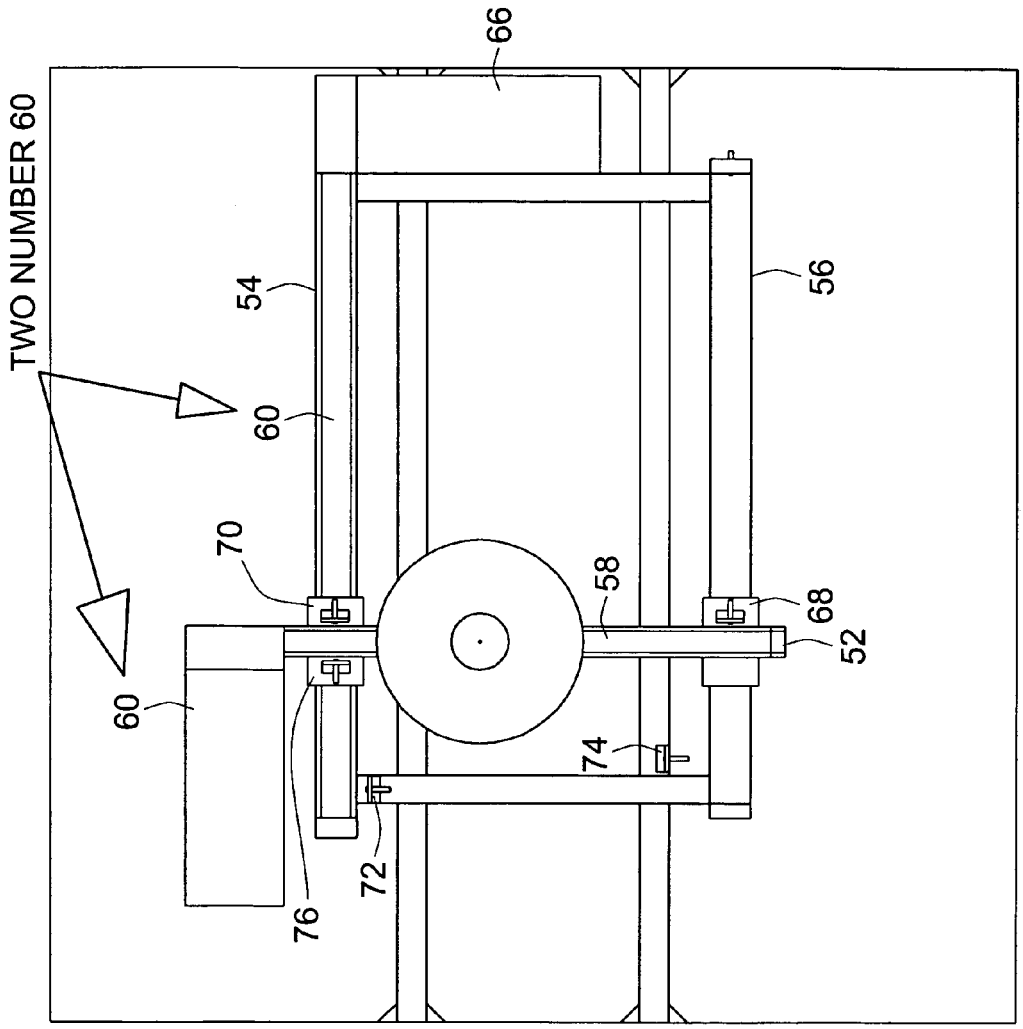
FIG. 9 is a top view of a transport system of the impact testing system for moving the load cell in two dimensions.

The transport 22 allows the load cell 20 to move in two dimensions (X-Y) that are perpendicular to the axis of the spray 38. During a spray pattern measurement, the load cell is moved in the X and Y directions under computer control to scan the spray pattern. As shown in FIG. 9, the transport 22 includes a rail 52 extending in the Y direction, and two rails 54, 56 extending in the X direction. The load cell 28 is mounted on a plate that rides on the rail 52, which in turn rides on the rails 54, 56. The load cell 28 is movable in the Y direction along the rail 52 by means a belt 58, which is driven by a motor 60, while the rail 52 is movable in the X direction along the rails 54, 56 by means of a belt 60 that is driven by a motor 66. Limit switches 68, 70, 72, 74, and 76 defines the travel limits of load cell.

Figure 2:
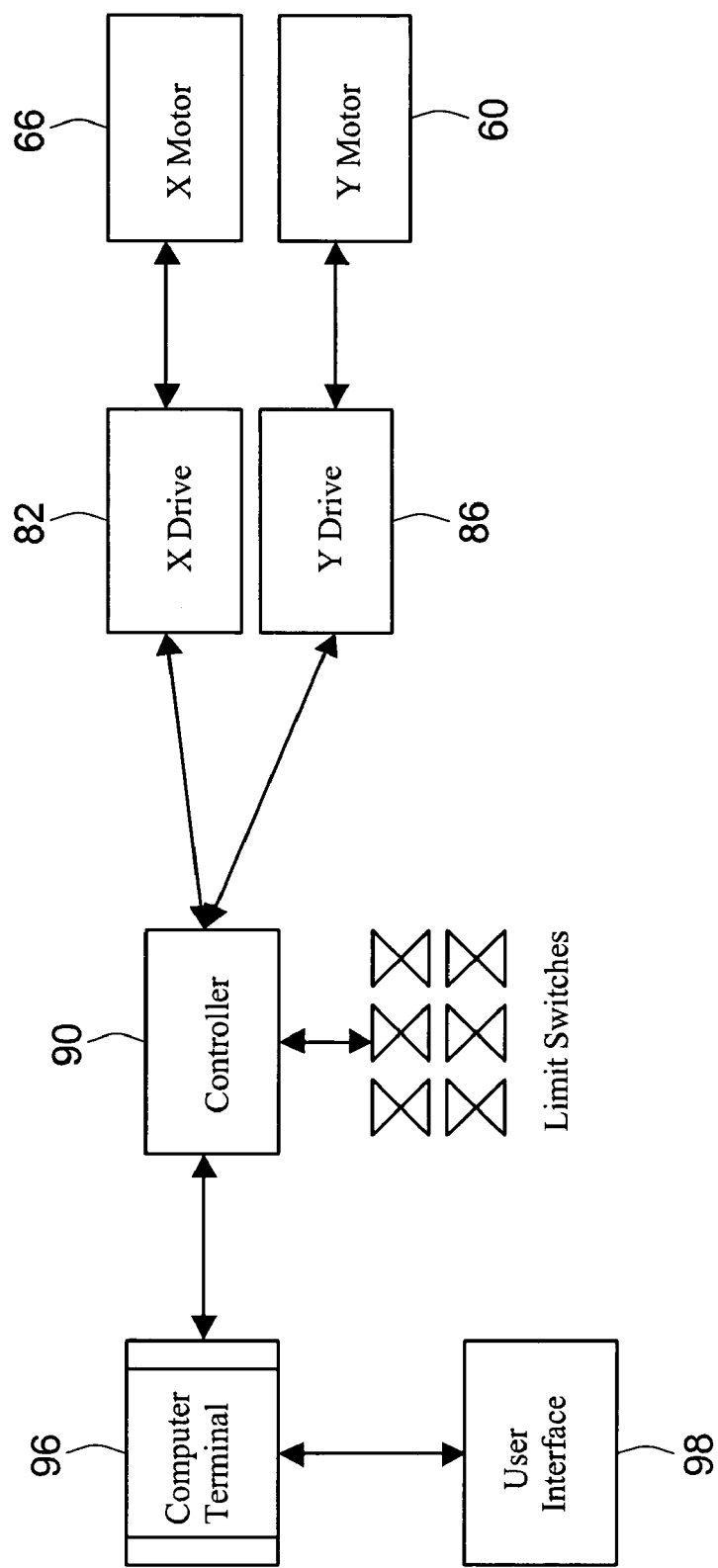
FIG. 2 is a schematic diagram showing the automated control system of the impact testing system for movement of the load cell.

Turning to FIG. 2, the transport control of the impact testing system includes an X-drive 82 and a Y-drive 86 that control the operation of the X-motor 66 and Y-motor 60, respectively. The X-drive 82 and Y-drive 86 are in turn controlled by a controller 90, which also receives inputs from the limit switches. The controller 90 communicates with a computer terminal 96, which runs an application program for carrying out a spray pattern measurement sequence and provides a user interface 98 for receiving user input and presenting measured data. The parameters for the test are input into the computer 96, where the program calculates how large the testing area will be. In one embodiment, when the test is first started, the load cell 20 has to be "homed." This means that the load cell moves from whatever its current location is to the outmost X position and the outmost Y position. To that end, each corner of the grid of the transport has a limit switch that defines the room the load cell has to move. When the load cell is homing, it moves until both the positive X and Y switches are tripped. This defines the "home" position of the load cell. From that point, the transport under the control of the computer program moves the load cell to a pre-programmed "zero" position, which marks the middle of the spray to be measured. The spray pattern scan is then started, during which the computer program tells the controller 90 where to move, how fast to move, and how many measurements to take at each location. The controller 90 then tells the X drive 82 and Y drive 86 where and when to move the load cell 20.

Figure 3:
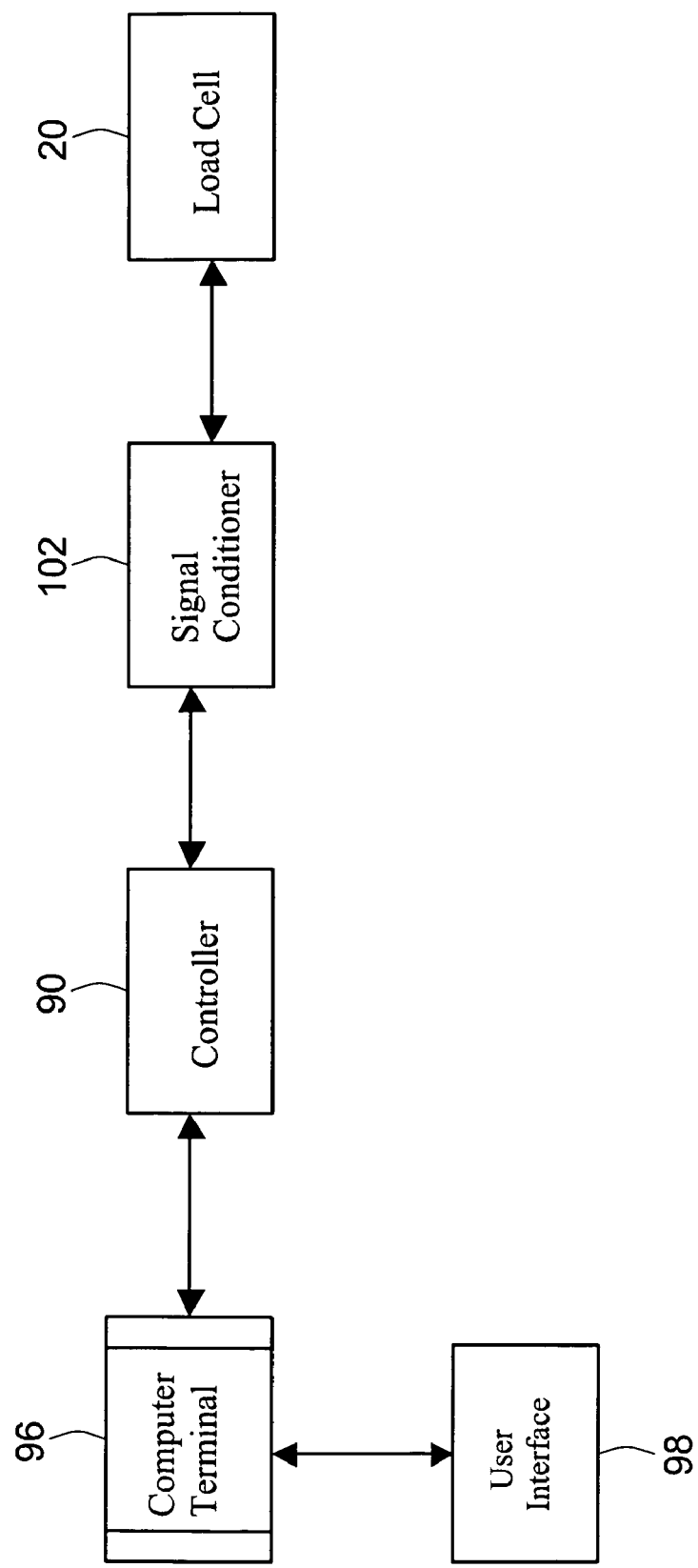
FIG. 3 is a schematic diagram showing the data acquisition path of the impact testing system.
Figure 7:
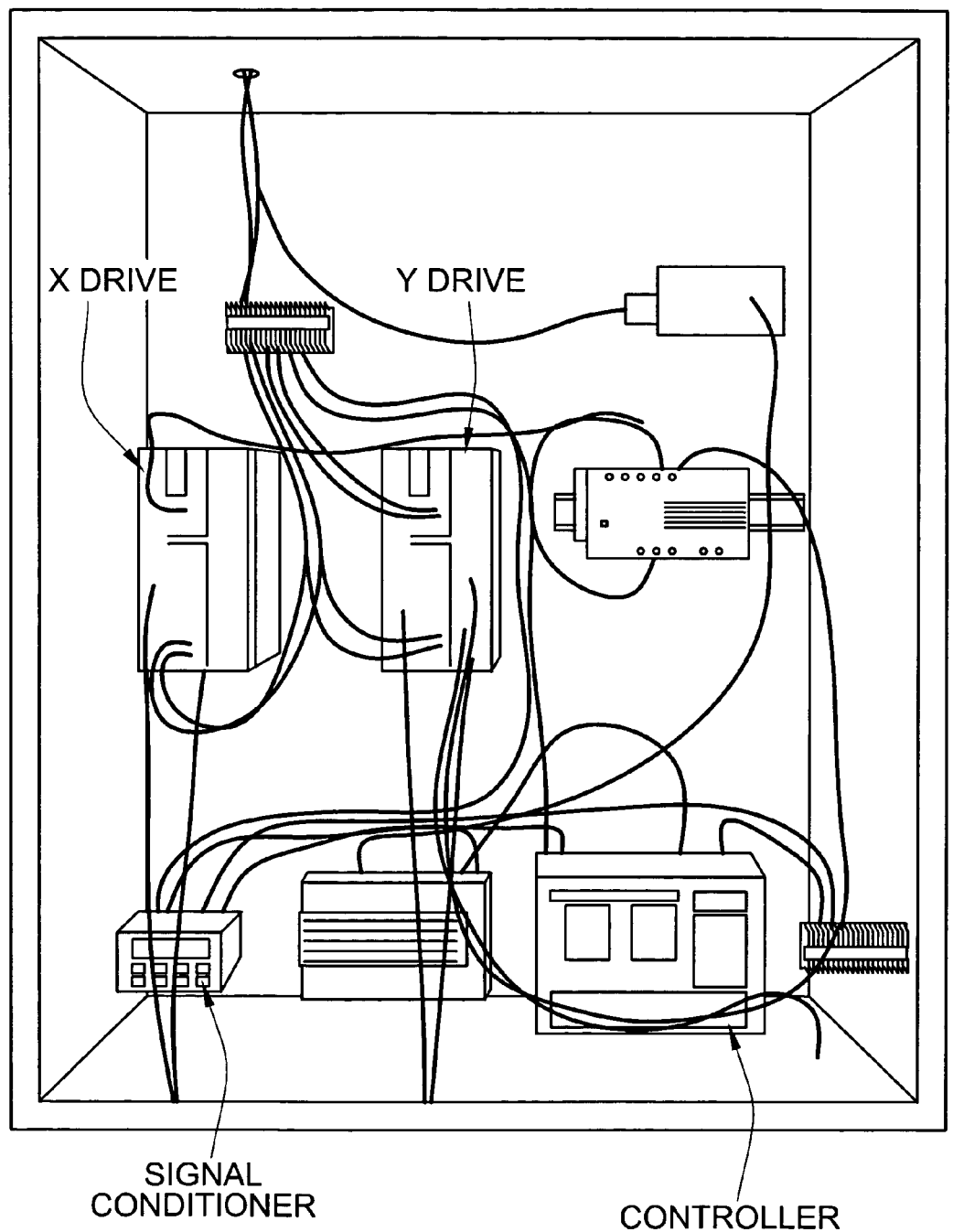
FIG. 7 is a view showing components of control electronics for movement control and data acquisition.
Figure 8B:
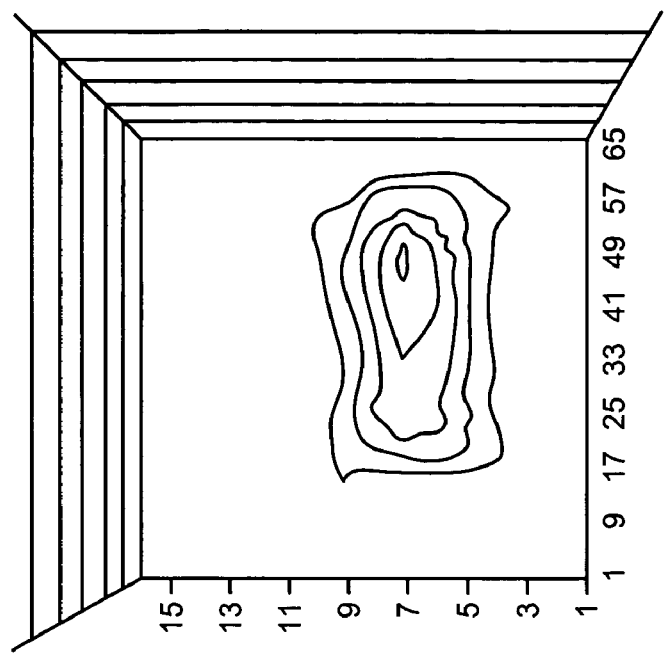
FIGS. 8a–c are exemplary graphic presentations of measured spray impact patterns.
Figure 8A:
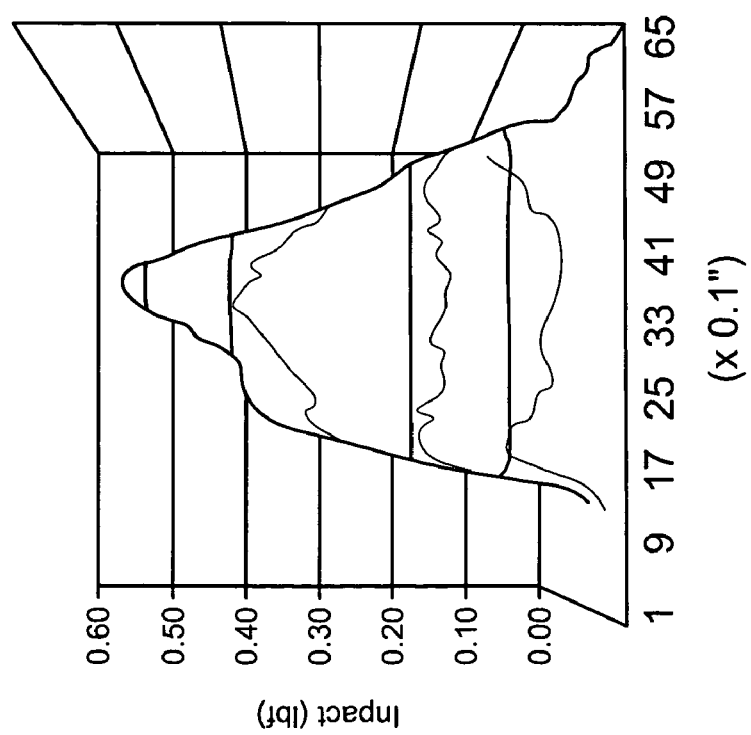
Figure 8C:
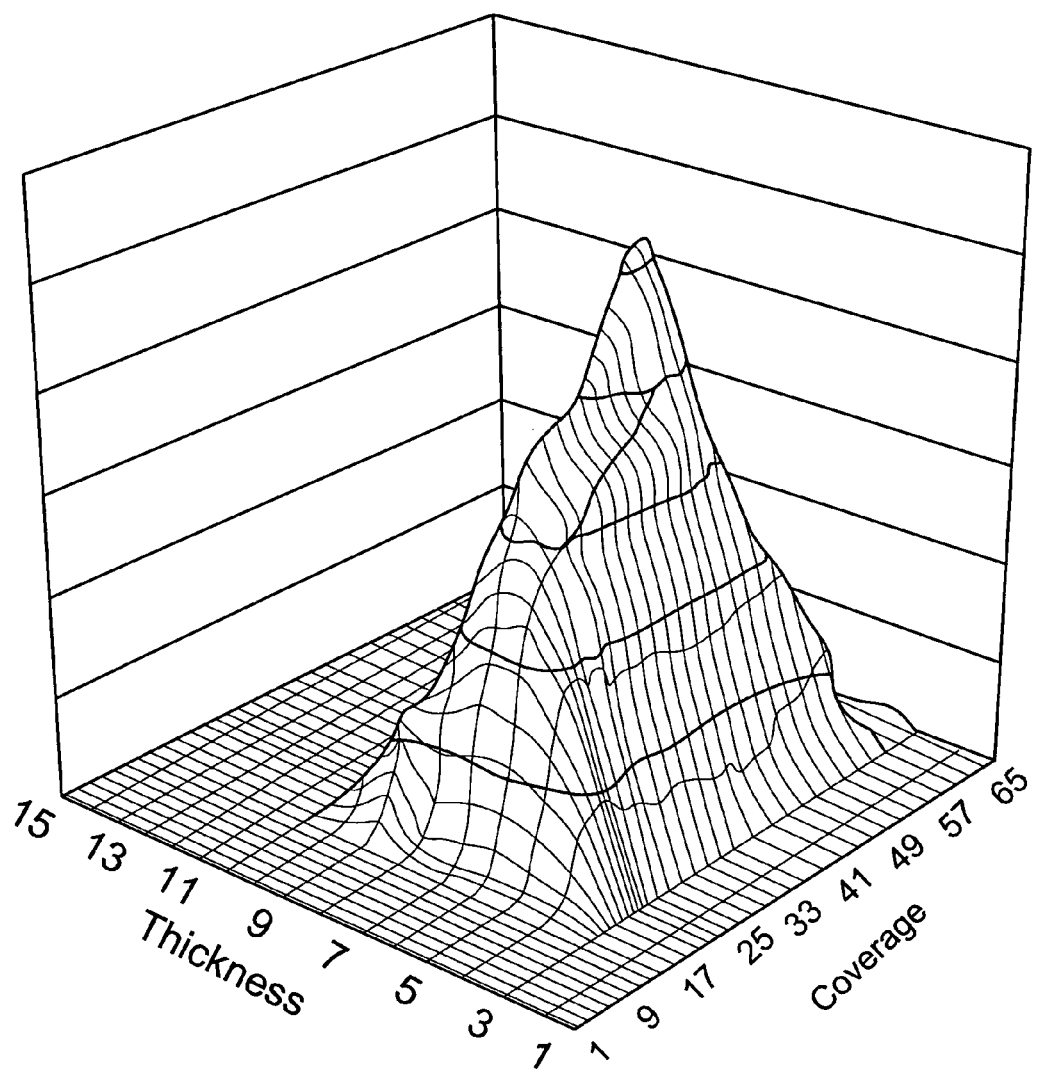

Referring to FIG. 3, when the load cell 20 is moved to a measurement location and the cell is ready for data acquisition, impact data are measured for that location. The computer program has to determine how many data points it wants to collect at that given location. The user may enter the number of readings to be taken at each point. The readings are then averaged to determine a value at that point. This value is then recorded as a single number into a database. Generally, the load cell 20 gives a DC signal corresponding to the load being sensed by the strain gauge in the load cell. This signal is sent to the signal conditioner 102, which converts the signal to an output indicative of the force (e.g., in pounds) based on a previously performed calibration. The signal conditioner 102 constantly reports the force value to the controller 90. The controller 90 then determines when to take a reading based on the position of the load cell 20. That reading is then sent to the computer 96, where it is stored in a measurement database along with the corresponding X and Y positions of the load cell 20. The physical layout of the X and Y drives 82, 86, the controller 90, and the signal conditioner 102 in one implementation is shown in FIG. 7. The measured data may be presented in different graphic forms for viewing by the user. For instance, in FIGS. 8a–c, the measured impact data are presented in a lateral view 110, an isometric view, 112, and a contour view 116.

Figure 12:
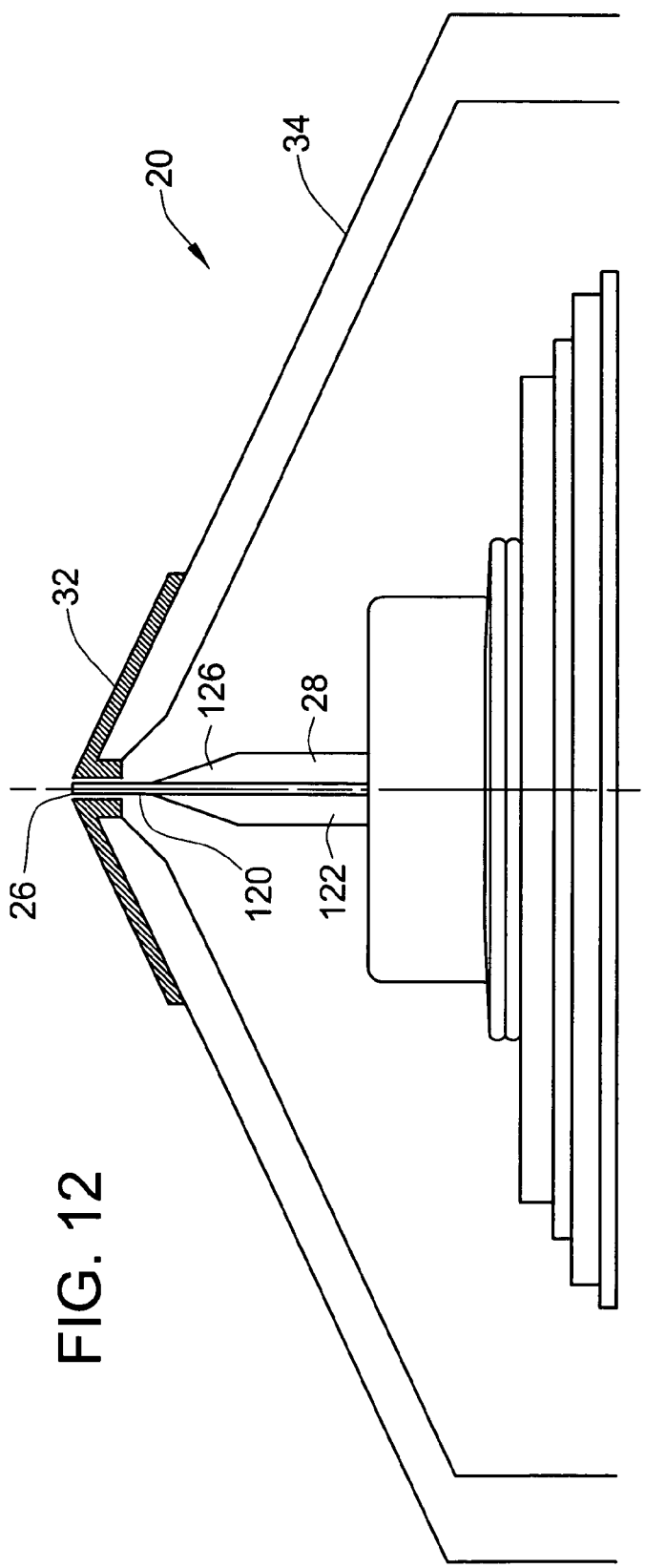
FIG. 12 is a cross-sectional view showing dimensions of the sensing pin and the aperture in an embodiment of the invention.

Referring now to FIG. 12, in accordance with a feature of the invention, a special geometry of the sensing pin 28 and the aperture 26 allows the load cell 20 to provide reliable readings of fluid impact on the pin when the pin is subject to the high-pressure flow of the spray from a high-impact nozzle. The inventors have discovered an unexpected result that for a given sensing pin, there is a fairly narrow range of the dimension of the aperture that would allow the load cell to provide reliable and reproducible readings.

In one implementation as illustrated in FIG. 12 that produce successful results, the sensing pin 28 has a thin cylindrical sensing section 120, a wider cylindrical base section 122, and a tapered section 126 connecting the sensing section 120 and the base section 122. The sensing section 120 has a diameter of 0.077" and a length of 0.545", while the base section 122 has a diameter of 0.5" and a length of 0.9". Thus, the overall height of the sensing pin 28 is about 2". The length of the sensing section is selected to be sufficiently long so that the water coming through the gap at the aperture around the pin would lose its velocity and thus would not impact the base section of the pin or the base 40 to cause large fluctuations in the impact reading. The overall height of the pin is such that the end surface of the sensing section 120 is about flush with the top end of the aperture 26. The tapered section 126 has a length of 0.58" and a taper angle of 20 degrees. The angled surface of the tapered section is intended to dampen the vertical component of the force exerted by the water that comes down along the sensing pin 20. The aperture 26 in the protective plate 32 through which the sensing section 120 of the pin extends has a diameter of 0.150". Thus, the diameter of the aperture 26 is larger than the pin diameter at the sensing section 120 by about 0.075", or about twice the diameter of the sensing section.

Figure 13:
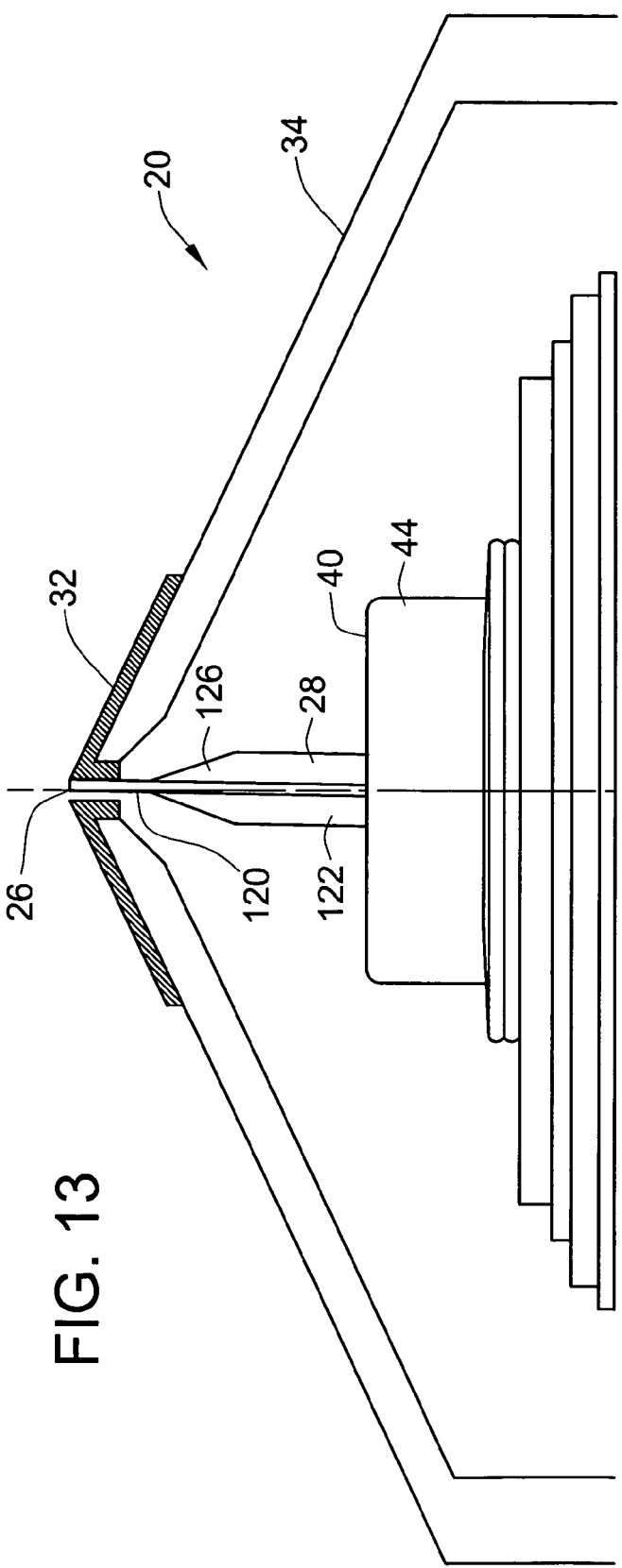
FIG. 13 is a cross-sectional view similar to FIG. 12 but showing a small rotation/tilting of the sensing pin within the limit of the aperture.

As shown in FIG. 13, in this configuration, the sensing pin is allowed to pivot or rotate about the connection point to the base by about 1 degree before its sensing section 120 touches the edge of the aperture 26. This is determined based on the equation:

ApertureDiameter=2×
(tanθ×PinHeight+0.5×PinDiameter).

Equivalently, this relationship may be expressed as:

ApertureDiameter−PinDiameter=2 tanθ×PinHeight

It is expected that during an impact measurement the pin 20 will vibrate under the pressure of the high-pressure flow, and if pin vibrates hard enough to hit the protective plate 32, the load cell will give erroneous readings.

Figure 14A:
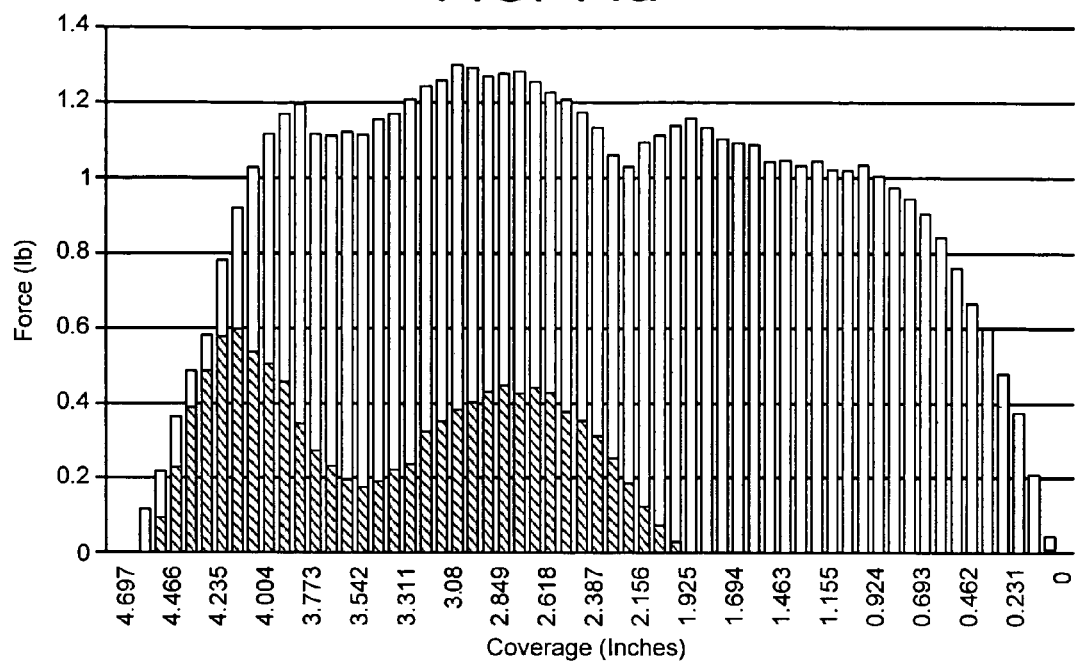
FIGS. 14a–b are graphs showing an exemplary spray pattern measured with the load cell of the embodiment shown in FIG. 12.
Figure 14B:
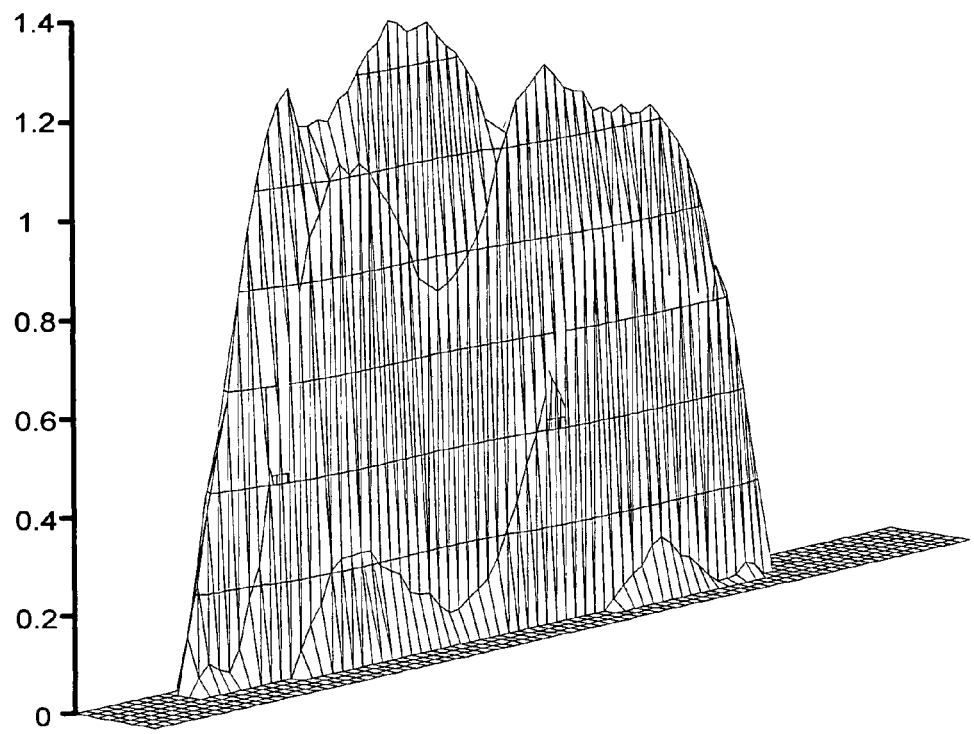
Figure 15A:
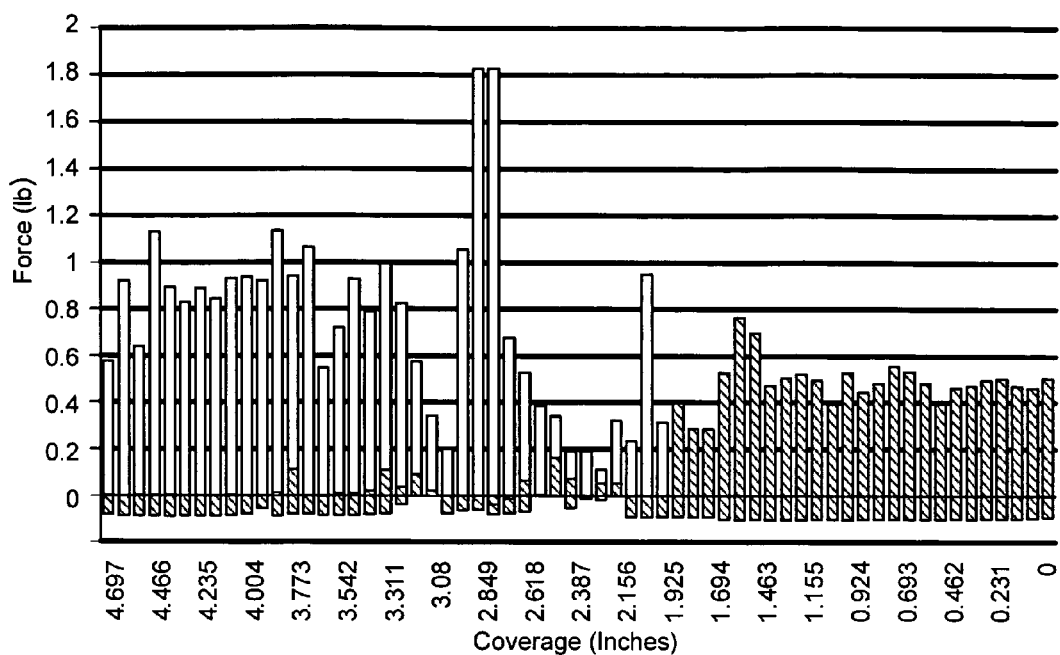
FIGS. 15a–b, 16a–b, 17a–b, and 18a–b are graphs of pressure data measured using setups that have pin-aperture configurations different from that used in the embodiment of FIG. 12.
Figure 15B:
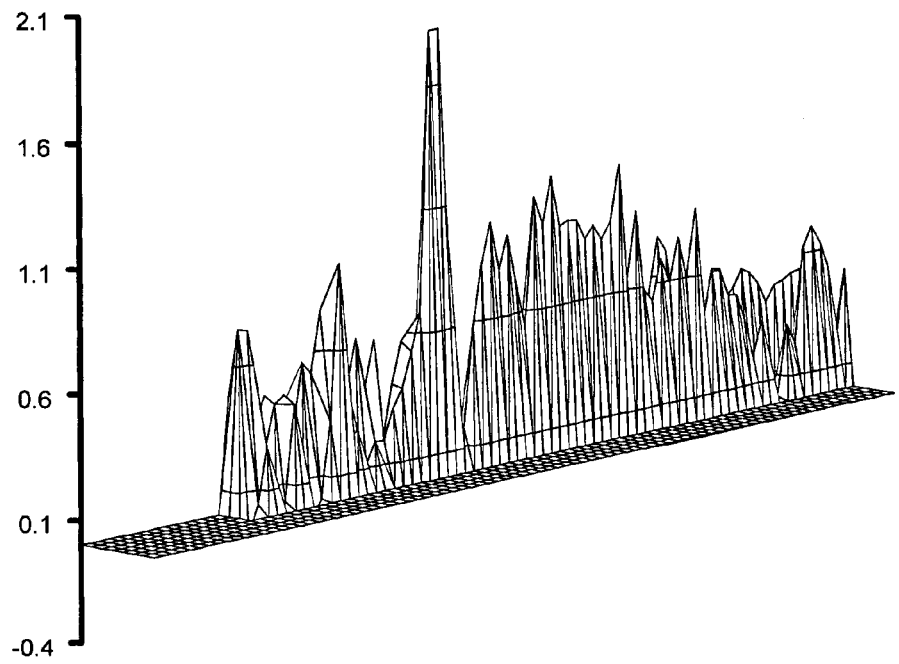
Figure 16A:
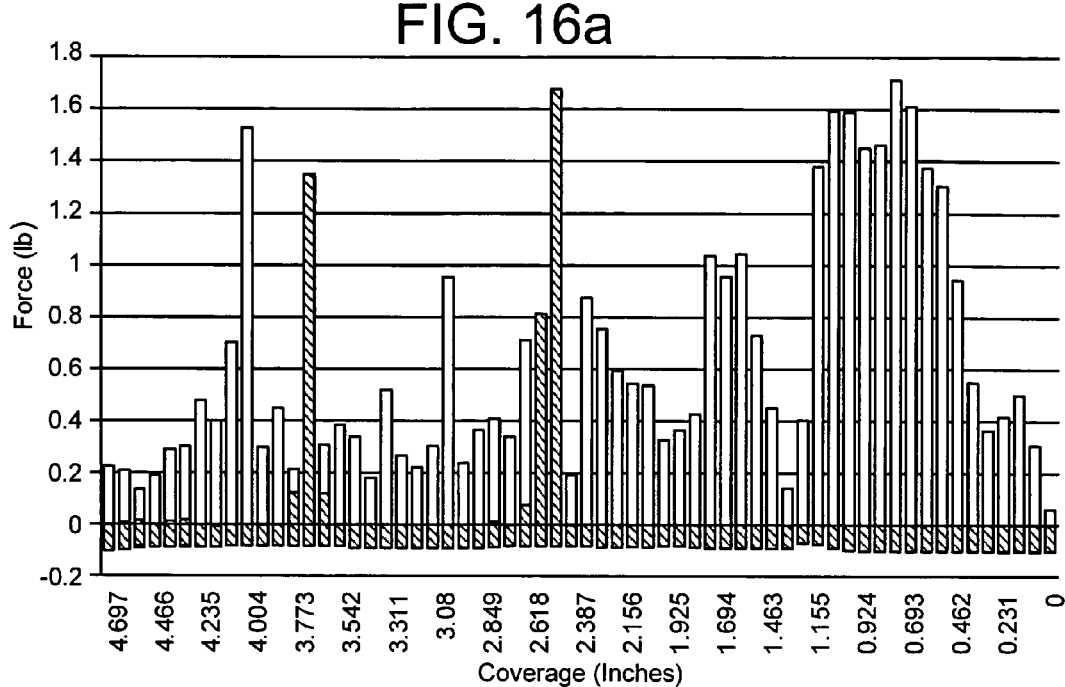
Figure 16B:
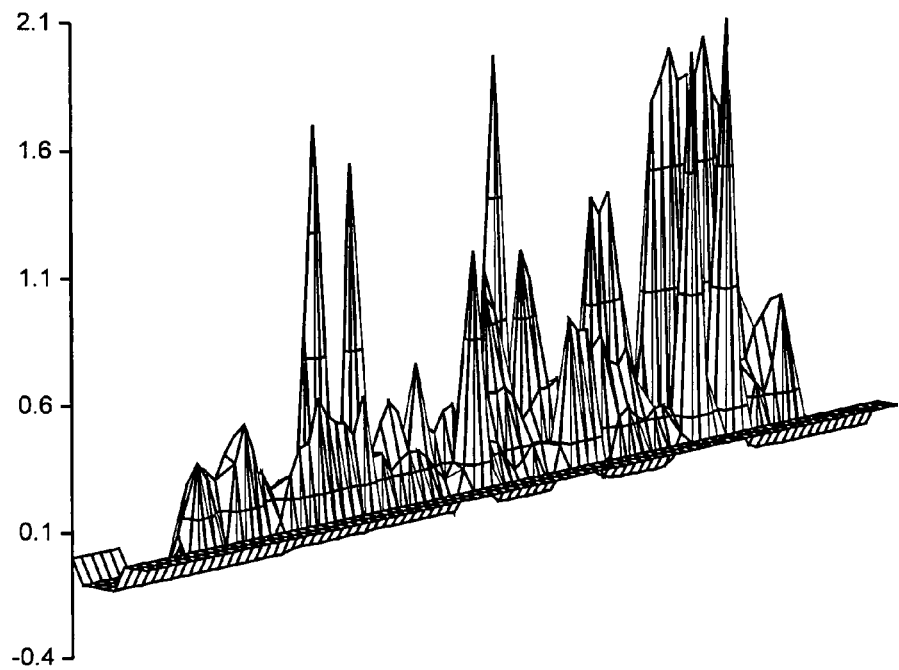
Figure 17A:
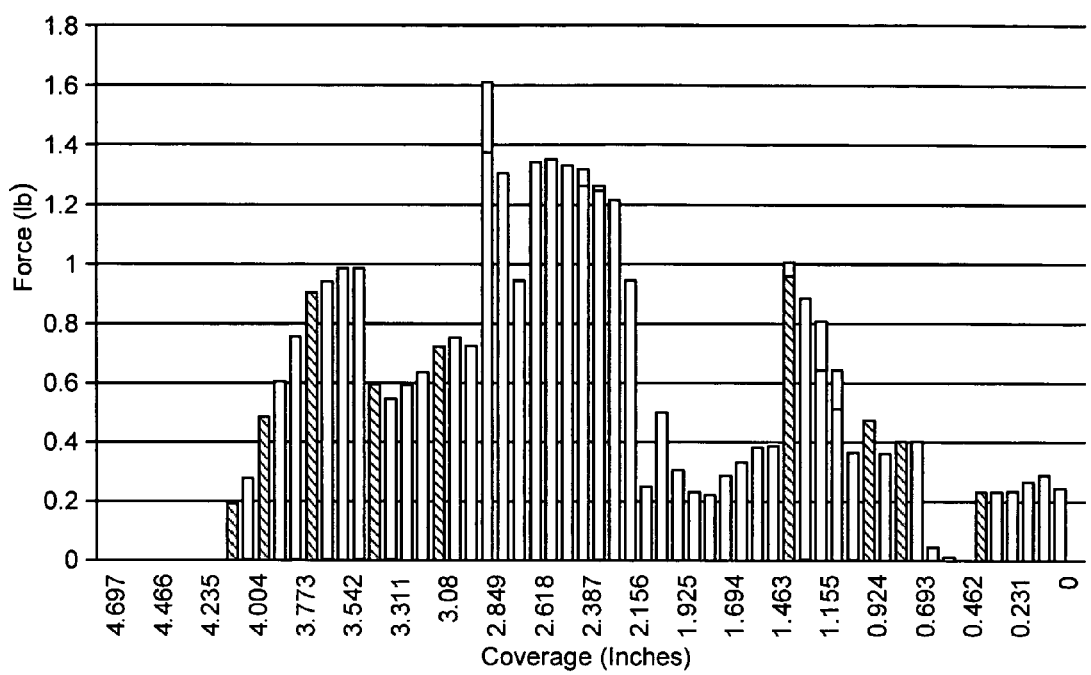
Figure 17B:
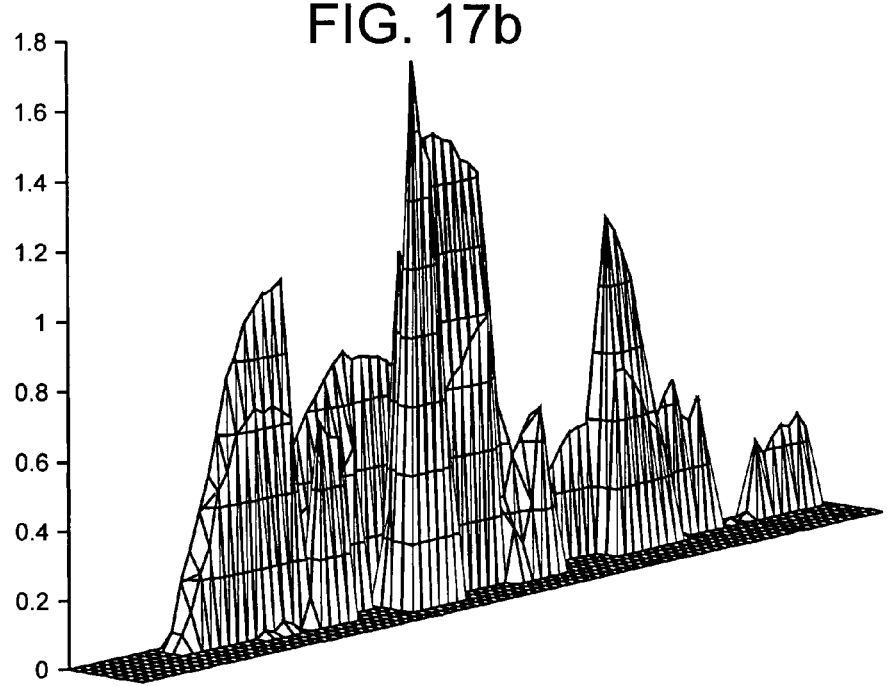
Figure 18A:
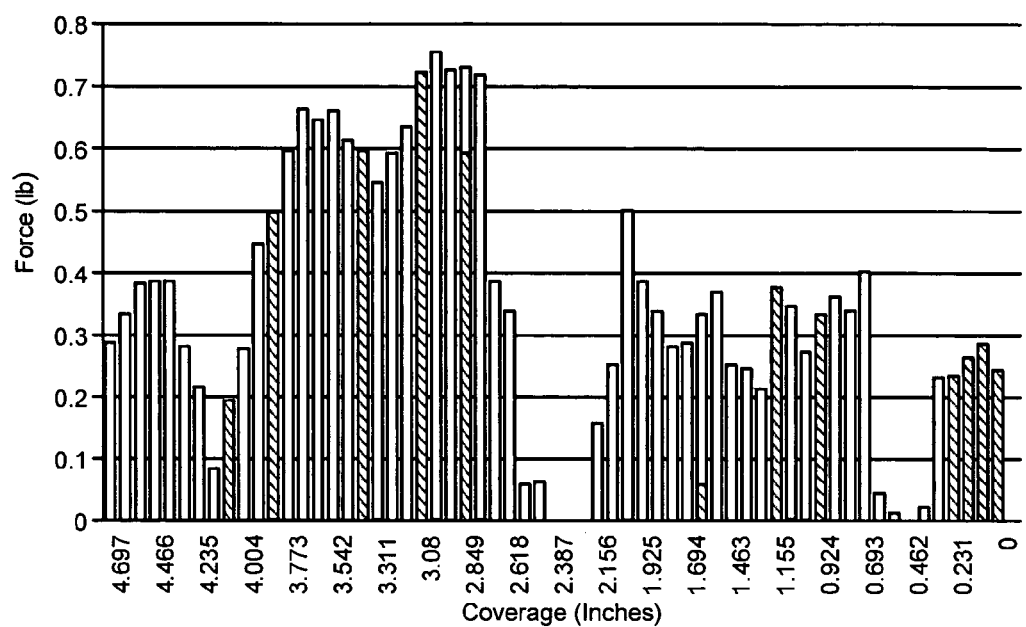
Figure 18B:
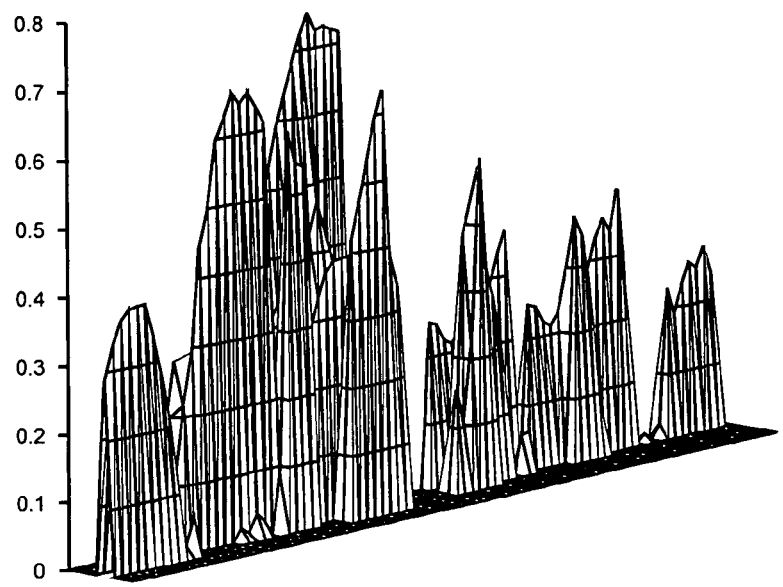

Reliable and repeatable high-quality measurements of spray patterns have been obtained with this configuration in FIG. 12. An exemplary spray pattern measured with a load cell with this configuration is shown in FIGS. 14a–b. In contrast, tests have been performed on configurations in which the pin diameter is maintained at 0.077" but the aperture diameter is incremented or decremented from 0.150". The test results for aperture diameters set at 0.100", 0.200", 0.125", and 0.175" are shown in FIGS. 15a–b, 16a–b, 17a–b, and 18a–b, respectively. It can be seen that the measured impact data for these aperture diameters are unacceptable due to excessive spikes and dropouts in the impact profile. Thus, the measured data in FIGS. 14–18 show that the combination of a sensing pin with a diameter of 0.077" together with an aperture of a diameter of 0.150" produces excellent results, but the load cell would produce unusable results when the aperture is made larger or smaller by merely 0.025".

One explanation for the poor results for the apertures larger than 0.150" is that if the aperture is too large the high-pressure water flow will get through the gap between the pin and the aperture and impact on the lower portion of the pin, and the turbulence created by the water flow would product would cause fluctuations in the impact readings. On the other hand, when the aperture is made smaller than 0.150", the pin would hit the inner surface of the aperture when it vibrates under the pressure of the spray, thereby generating errors and creating noise in the impact readings.

It will be appreciated that a new automated impact testing system that can be used to reliably measure the characteristics of a spray pattern generated by a high-impact nozzle has been disclosed herein. In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

What is claimed is:

1. An impact sensing system for measuring an impact pattern of a spray, comprising:
a load cell for detecting an impact force at a detection location within the spray and generating an impact signal, the load cell including a protective housing having an aperture therein and a sensing pin mounted within the protective housing, the sensing pin having a sensing section extending through the aperture to expose an end surface of the sensing pin, the sensing section having a diameter of about 0.077" and the aperture having a diameter of about 0.150"; and
a transport coupled to the load cell to move the load cell to selected detection locations within the spray.

2. An impact sensing system as in claim 1, wherein the sensing pin has a height of about 2".

3. An impact sensing system as in claim 1, wherein the load cell further includes a strain gauge, the sensing pin being mechanically coupled to the strain gauge such that the strain gauge provides an electrical signal indicative of a pressure exerted on the sensing pin by the spray.

4. An impact sensing system as in claim 3, wherein the sensing pin is mounted on a support base covered by a waterproof housing.

5. An impact sensing system as in claim 1, wherein the sensing pin further includes a base section thicker than the sensing section and a tapered section connecting the base section and the sensing section.

6. An impact sensing system as in claim 1, wherein the transport provides travel in two orthogonal directions.

7. An impact sensing system for measuring an impact pattern of a spray, comprising:
a load cell for detecting an impact force at a detection location within the spray and generating an impact signal, the load cell including a protective housing having an aperture therein and a sensing pin mounted within the protective housing, the sensing pin having a sensing section extending through the aperture to expose an end surface of the sensing pin, the sensing section having a diameter that is about 0.075" smaller than a diameter of the aperture; and
a transport coupled to the load cell to move the load cell to selected detection locations within the spray.

8. An impact sensing system as in claim 7, wherein the diameter of the sensing section of the sensing pin is about 0.077" and the diameter of the aperture in the protective housing is about 0.150".

9. An impact sensing system as in claim 8, wherein the sensing pin has a height of about 2".

10. An impact sensing system as in claim 7, wherein the load cell further includes a strain gauge, the sensing pin being mechanically coupled to the strain gauge such that the strain gauge provides an electrical signal indicative of a pressure exerted on the sensing pin by the spray.

11. An impact sensing system as in claim 10, wherein the sensing pin is mounted on a support base covered by a waterproof housing.

12. An impact sensing system as in claim 7, wherein the sensing pin further includes a base section thicker than the sensing section and a tapered section connecting the base section and the sensing section.

13. An impact sensing system as in claim 7, wherein the transport provides travel in two orthogonal directions.

14. An impact sensing system for measuring an impact pattern of a spray, comprising:
a load cell for detecting an impact force at a detection location within the spray and generating an impact signal, the load cell including a protective housing having an aperture therein and a sensing pin mounted within the protective housing, the sensing pin having a sensing section extending through the aperture to expose an end surface of the sensing pin, the sensing section and the aperture being dimensioned to allow the sensing pin to pivot by about 1 degree during impact measurement; and a transport coupled to the load cell to move the load cell to selected detection locations within the spray.

15. An impact sensing system as in claim 14, wherein the sensing pin has a height of about 2", and the sensing section of the sensing pin has a diameter that is smaller than a diameter of the aperture by about 0.075".

16. An impact sensing system as in claim 15, wherein the diameter of the sensing section of the sensing pin is about 0.077" and the diameter of the aperture in the protective housing is about 0.150".

17. An impact sensing system as in claim 14, wherein the load cell further includes a strain gauge, the sensing pin being mechanically coupled to the strain gauge such that the strain gauge provides an electrical signal indicative of a pressure exerted on the sensing pin by the spray.

18. An impact sensing system as in claim 17, wherein the sensing pin is mounted on a support base covered by a waterproof housing.

19. An impact sensing system as in claim 14, wherein the sensing pin further includes a base section thicker than the sensing section and a tapered section connecting the base section and the sensing section.

20. An impact sensing system as in claim 14, wherein the transport provides travel in two orthogonal directions.

* * * * *